United States Patent [19]

Külper

[11] 4,342,066
[45] Jul. 27, 1982

[54] ELECTRICAL CONDENSER WITH A DIELECTRIC OF GAS UNDER PRESSURE

[76] Inventor: Klaus Külper, Almhagsvägen 17, 170 10 Ekerö, Sweden

[21] Appl. No.: 38,569

[22] Filed: May 14, 1979

[30] Foreign Application Priority Data

May 16, 1978 [SE] Sweden .................................. 7805611

[51] Int. Cl.³ .............................................. H01G 5/02
[52] U.S. Cl. ...................... 361/278; 361/279; 361/283; 361/290; 361/326
[58] Field of Search ............... 361/278, 279, 283, 302, 361/290, 291, 326, 271, 274; 331/96–98

[56] References Cited

U.S. PATENT DOCUMENTS

| | | | |
|---|---|---|---|
| 1,399,877 | 12/1921 | Pupin | 361/279 X |
| 1,545,207 | 7/1925 | Smith | 361/326 |
| 1,939,067 | 12/1933 | Cegg | 361/283 X |
| 2,107,387 | 2/1938 | Potter | 331/97 X |
| 2,369,177 | 2/1945 | Raskhodoff | 361/278 |
| 2,428,554 | 10/1947 | Cassen | 331/97 X |
| 2,571,507 | 10/1951 | Welch | 361/283 X |
| 3,258,666 | 6/1966 | Dublier | 361/271 |
| 3,405,559 | 10/1968 | Moffatt | 361/283 X |
| 4,039,982 | 8/1977 | Weldon | 361/287 |

FOREIGN PATENT DOCUMENTS

| | | | |
|---|---|---|---|
| 52808 | 10/1911 | Fed. Rep. of Germany | 361/326 |
| 308462 | 5/1972 | U.S.S.R. | 361/326 |

*Primary Examiner*—Elliot A. Goldberg
*Attorney, Agent, or Firm*—LeBlanc, Nolan, Shur & Nies

[57] ABSTRACT

The present invention relates to a condenser for high power and with a gas shaped dielectric and preferably intended for tank circuits in high frequency generators and radio transmitters. The electrodes of the condenser consists of two metal tubes (1 and 2) with different diameters and located concentrically relative to each other. Those tubes are at both ends gas tight connected to each other so that a space is formed by the air gap between the tubes (1,2) which space can be filled with gas under pressure. The space inside the tube (2) with the smallest diameter is open and can be used for a transmitter tube to be located therein.

4 Claims, 3 Drawing Figures

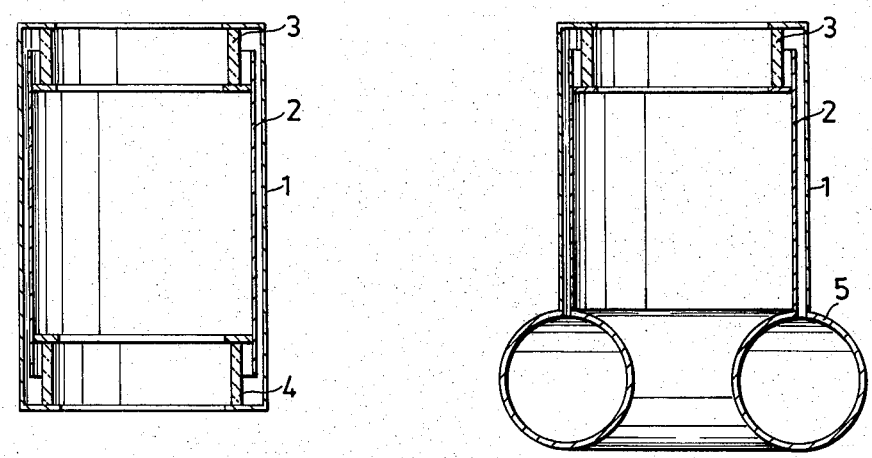
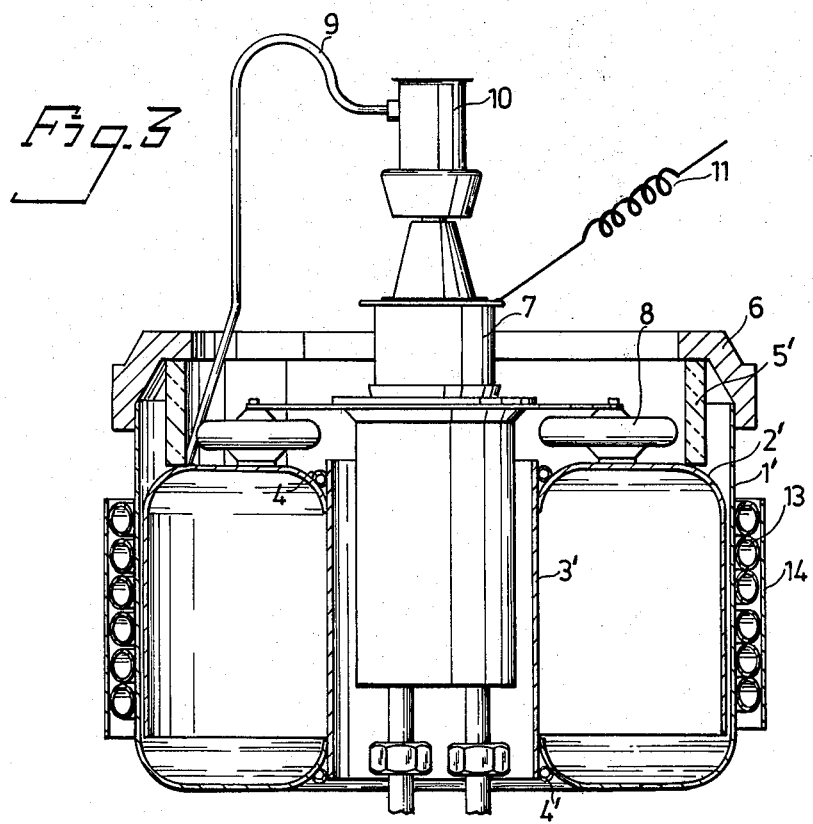

ELECTRICAL CONDENSER WITH A DIELECTRIC OF GAS UNDER PRESSURE

The present invention relates to a condenser.

High frequency condensers and power amplifiers in radio transmitters which are operated with high vacuum tubes in class C, require oscillating circuits with a high reactive power. High frequency generators of for example 100 kW may have a reactive power of 10 MVA. At an amplitude of 8 kV$_{rms}$ which is given by the anode voltage of the transmitter tube, the current in the oscillating circuit must reach 1250 A. At the operating frequency, the inductance and the capacitance of the circuit must have a reactance of + or −8000 V/1250 A = 6.4 Ohms. At the frequencies which are common for the industry generators and have the values 0.5 MHz (for inductive heating) or 27 MHz (for dielectrical heating), respectively, the capacitances will be 50 or 1 nF, respectively.

The capacitance of 50 nF required for the frequency of 0.5 MHz is usually designed as a battery of water cooled ceramic condensers which due to the high dielectricity constant of the ceramic are very compact but unfortunately give rise to high losses. In the example chosen, the losses will be 5 kW in the ceramic and 2 to 3 kW in increased anode losses. At higher frequencies with lower corresponding capacitance requirements, one usually prefers condensers with a dielectric in the form of a gas without losses, such as air-, pressure gas- or vacuum-condensers.

An air condenser having metal electrodes and atmospherical air as dielectric, requires in the example chosen (1 nF, 8 kV) an air gap of about 13 mm and an electrode surface of about 1.5 m$^2$. With vacuum or gas under pressure the distance between the electrodes and, as a consequence, also the electrode surface may be reduced to about 1/5. The electrodes have then to be enclosed in a gas tight cover with at least one insulated lead-in wire therethrough. Due to the limited depth of penetration, the high frequency current must in that case inevitably pass the limit layer between the insulator and the lead-in wire which in the case of ceramic consists of soldering tin and in case of glass of an alloy with the same coefficient of heat expansion as glass. Both of the said kinds of metal have much lower electrical conductance than copper. As at the same time the joint between the lead-in wire and the electrode to which said wire is connected is very sensitive to heat, the ability of the condenser to conduct current will be limited to some hundreds of amperes. If vacuum or pressure gas condensers of a known construction should be used in the 100 kW generator chosen in the example, a plurality of condenser units must therefore be connected in parallel. The inductances and the stray capacitances of the connections between the units may form new tuned circuits which make it more difficult to achieve an even current distribution between the condensers and which easily may be in resonance with a harmonic of the oscillator frequency, especially in high frequency generators with a varying load. Air condensers are therefore, in spite of their higher sensitivity to dust and moisture, more useful.

In a 27 MHz-generator in the power class of 400 kW also the air condenser has, however, its limitations. Firstly, the great surfaces of the electrodes lead to that the internal resonances which always will arise in the shape of standing waves, will be of a frequency in the neighbourhood of the second or third harmonic of the operating frequency, which will give rise to an uneven voltage distribution and a breakdown risk. Secondly the relative great distance between the transmitting tube and the condenser will give to result that the sum of the inductances of the conductors to the electrodes together with the output capacitance of the tube will be in resonance under or very near the second harmonic (the double operating frequency) which would reduce the efficiency of the generator to an unacceptable level.

The pressure gas condenser according to the present invention combines the current conducting ability of the air condenser with the compactness and low sensitivity to the outer atmosphere of the pressure gas or vacuum condenser.

Hitherto known pressure gas condensers consist of a number of metal cylinders which either are kept together to form a rotation-symmetrical pattern by an outer envelope of glass or ceramic with terminals in both ends or are placed in a pot-shaped metallic pressure vessel, which constitutes one of the terminals of the condenser while the other terminal is located in a lead-through insulating member in the lid of the vessel. In both cases the whole vessel is, for the sake of compactness, filled with a plurality of concentric cylinder electrodes.

Such a condenser is for example, known from German Pat. No. 171.117 which dates from a time (1905) when the high frequency power was generated by a spark gap in connection with an oscillating circuit.

The characterizing features of the condenser according to this invention are that the electrodes of the condenser consist of two metal tubes with different diameters, located one in the other, the tubes at both ends being gas tight sealed to each other so that the air gap between the tubes is a space which can be filled with compressed gas, while the space along the center axis of the condenser remains open and is accessible for a transmitter tube to be located therein.

FIG. 1 is a cross section of a capacitor with two tubes.

FIG. 2 is a cross section of a capacitor with a torrodial-shaped cavity.

FIG. 3 is a cross section of transmitter tube and capacitor.

The condenser according to the invention (FIG. 1) consists of only two metal tubes 1 and 2 with a rather small difference of diameters. The tube with the greater diameter constitutes the outer mantle of the pressure vessel. The gap between the tubes will be a few millimeters, depending of which voltage the condenser is intended for. The tubes are mutually fixed to each other by means of annular insulators 3,4 in both ends which at the same time seals the space of the gap between the tubes so that said gap can be filled with an electron catching gas, for example SF$_6$. According to tests that have been made, a condenser with an air gap of 2 mm and a gas pressure of 4 bar will be capable of handling a high frequency voltage of 15 kV peak value. The sealing between the insulating rings and the metal tubes can be in the form of rubber packings if such packings, for example by being retracted in the metal, are not exposed to the electrical field. The condenser terminals can have the shape of flanges of each tube and thanks to their great surfaces they may conduct over thousand amperes without any considerable heat development.

The difference between the condenser according to the invention and the known condensers are apart from the ability to conduct considerably stronger current, the design of the tubes, which makes it possible to place the transmitting tube in the centre of the condenser. Thereby, the inductance of the connection between the tube and the oscillating circuit can be kept very low which is of a conclusive importance for the efficiency of the oscillator tube.

The condenser is very suitable for combining with a parallel-connected oscillating circuit which has an inductance in the form of a toroid-shaped cavity 5 according to FIG. 2. If the metallic connection between the condenser and the cavity is gas-tight, one of the insulating rings can be dispensed with. The strong current in the oscillating circuit in this case need not pass any insulator rim, which, among other advantages, reduces the losses in the oscillating circuit to very low values. A corresponding oscillating circuit with the same inductance and cylinder diameter but with atmospherical air as dielectric in the condenser would require five times greater air gap and, because of that, five times longer cylinders which would result in five times greater losses.

An embodiment of the invention which should be considered as an example only, and which has been tested in practice in an oscillator for 27 MHz was provided with a modern water cooled 180 kW transmitter tube and is shown in FIG. 3. The outer diameter is a little less than ½ meter and the height of the oscillator circuit is 0.35 m. With a little greater dimensions a transmitter tube with double power may be used and may be operated at the same frequency.

The oscillator circuit comprises two copper pots 1' and 2' produced by pressure turning. Said copper pots are connected to each other through a copper tube 3'. The joint is so designed that tin soldering is sufficiently strong and stable at the same time as the tin joint provides a place for a cooling loops 4'. The annular insulating ring 5' consists of polypropylene and is kept in place by the light metal ring 6. The sealing between the different rings have the shape of rubber packings.

The transmitter tube located in the centre 7 of the circuit is supported by six ceramic saucer type condensers 8 which connect the anode with the circuit by a connection that transmits high frequency voltage or current. The anode DC voltage and the cooling water is supplied to the tube from the bottom. The connection is free of high frequency voltage and, therefore, an anode choke is not needed for the function of the oscillator.

The feed back is obtained by means of a water cooled copper tube 9 (belonging to the same cooling circuit as the loops 4'). The inductance of said copper tube 9 in cooperation with the inherent capacities of the tube gives the necessary phase- and amplitude ratio between the grid- and the anode voltages. A water cooled condenser 10 blocks the grid bias voltage but conducts the capacitive grid current of about 100 A. The grid DC current is by the choke 11 conducted away to the grid leak. The cathode is by means of a copper foil connected to the grounded ring 6.

In the tested embodiment, the taking out of the power was made by means of a coil connected to the top of the oscillating circuit between the condensers 8. Said output connection may alternatively also take place in a more conventional manner by means of an induction loop and a lead-through wire in the bottom of the vessel. Due to the small distance between the condensers, the capacitance will be strongly influenced by a rather small change of the diameter caused for example by a temperature difference between the outer cylinder and the inner cylinder. Therefore, it is important that the cooling water in the cooling loops of said cylinders should be of the same temperature.

On the other hand, the sensitivity to changes in the diameter may be utilized for accuratingly adjusting the capacitance and the frequency by compressing the outer or expanding the inner tube within the proportionality limit of the metal. The simplest way of doing that may be by means of an elastic hose 13 wound around the vessel 1 which in pressure free condition is somewhat compressed by a plate mantle 14. By controlling the air or the fluid pressure in said hose the frequency can be changed very rapidly by an amount of some percents. In generators for the industry with greatly varying reactive load a discriminator may, for example, be arranged to control two magnet valves, and, by increasing or decreasing the pressure, keep the frequency within the limits of ⅛% at 27.12 MHz.

In the practical tests the construction described has displayed the following advantages:

1. High overall efficiency, partly because of high Q-value of the circuit which has been measured by a calorimetric method and has been found to be approximately 5000, partly due to the low inductance between the circuit and the transmitting tube. An equally high efficiency degree can be expected to be obtained for powers up to at least 400 kW at 27 MHz.
2. No tendency of parasitic oscillations.
3. Very week radiation thanks to the careful screening of the main magnet field.
4. Low sensitivity to dust and air moisture.
5. Space saving.
6. Small production costs because of simple assembling of rather small, pressure turned parts.

I claim:

1. A high power condenser with gas dielectric and intended preferably for tank circuits in high frequency generators and radio transmitters, characterized by the fact that: the electrodes of the condenser consist of two metal tubes (1', 2') with different diameters, located one in the other to provide an annular air gap therebetween; means at both ends of said tubes providing that said tubes are gas tight sealed to each other so that the air gap between the tubes forms a space which can be filled with compressed gas, while the space along the centre axis of the tubes remains open and is accessible for a transmitter tube to be located therein; an end of each of said metal tubes is made with an annular pot shape and said tubes are telescopically related in a relatively inverted disposition; and said means providing gas tight sealing includes a cylindrical tube, concentrically inward of said metal tubes and secured to said metal tubes to maintain tubular portions of said metal tubes in radially spaced disposition.

2. Condenser according to claim 1 wherein expandible means are provided around the outermost of said metal tubes to provide a radially inwardly directed pressure on said outermost tube, which changes the diameter of said outermost tube and varies the capacitance of the condenser.

3. Condenser according to claim 2, wherein said expandible means is an elastic hose wound around said outermost tube and adapted to be subjected to internal pressure and expanded.

4. A high power condenser with gas dielectric and intended preferably for a tank circuit connected to a vacuum tube in a high frequency generator or a transmitter, consisting of: two metal tubes with different diameters, located coaxially one in the other and providing an annular space therebetween; means at the ends of said tubes providing that said tubes are gas tight sealed to each other to seal said annular space, said annular space between the tubes being filled with compressed gas, while the open space along the centre axis of said tubes remains disposable to the accommodation of a vacuum tube, said outer metal tube is provided with a pot shaped bottom at the lower end, said inner metal tube is provided with a pot shaped top at the upper end, and said top and said bottom are each provided with a centre opening, corresponding to the inner diameter of said annular space; and said means providing gas tight sealing between said tubes includes a further metal tube which joins said pot shaped top and bottom ends and acts as the inner conductor of the space between said two pot shaped tubes.

* * * * *